Dec. 2, 1969  D. L. MAYTUM ET AL  3,481,540

AGRICULTURAL SPRAYING PROCESS AND DEVICE

Filed Sept. 20, 1967

INVENTORS
DEREK LAURIE MAYTUM
KARL HEINZ EGGERSTEDT
By Cushman, Darby & Cushman
ATTORNEYS

United States Patent Office 3,481,540
Patented Dec. 2, 1969

3,481,540
AGRICULTURAL SPRAYING PROCESS AND DEVICE
Derek Laurie Maytum, Fernhurst, near Haslemere, England, and Karl Heinz Eggerstedt, Wedel, Germany, assignors to Imperial Chemical Industries Limited, London, England, a corporation of Great Britain
Filed Sept. 20, 1967, Ser. No. 669,054
Claims priority, application Great Britain, Sept. 27, 1966, 43,134/66
Int. Cl. B05c 5/00, 9/08; B05b 7/32
U.S. Cl. 239—1
9 Claims

ABSTRACT OF THE DISCLOSURE

A process and apparatus are described for mixing and dispensing a metered flow of agricultural chemical into a flow of liquid diluent. The agricultural chemical is metered into the diluent flow on an output side of a diluent pump and at a rate which is proportional to the speed of a tractor which carries reservoirs for the agricultural chemical and the diluent.

---

This invention relates to an agricultural spraying process and device.

Herbicides, fungicides, insecticides and like agricultural chemicals are generally applied to agricultural land or growing crops as a dilute solution or dispersion in a diluent, generally water. The application is conveniently carried out by a spraying device mounted on a tractor. Generally known spraying devices comprise a tank of dilute spraying solution communicating with a spray head through a large volume rotary pump.

The rotary pump is generally driven by a tractor power take-off that works at a speed proportional to the forward speed of the tractor: either to the ground speed or to the engine speed (in which case the take-off speed is also dependent on the gear selected). The capacity of the pump is chosen to provide a considerable reserve, so that at all normal tractor speeds the pump provides more than an adequate supply of liquid to the spray head. The excess is returned to the spray tank through a pressure relief valve. This arrangement ensures under normal working conditions a constant pressure of liquid at the spray head and a constant flow of liquid therethrough.

The correct rate of application of agricultural chemicals is extremely important; too much of, for example, an insecticide, may contaminate or otherwise damage crops, while too little will be ineffective. When using spraying devices of the foregoing type, in order to obtain the correct uniform rate of application it is necessary to prepare a dilute spray solution of the correct strength, adjust the pressure relief valve to provide the correct pressure, and drive the tractor forward at the correct steady speed.

The object of the present invention is to provide a tractor-operated agricultural spraying process and device which is easier to operate.

According to the present invention we provide a process for spraying a diluted agricultural chemical from a tractor, which comprises flowing liquid diluent from a liquid diluent reservoir to and through a spray head whilst metering agircultural chemical into the diluent flow before it reaches the spray head at a rate which is linearly proportional to the forward speed of the tractor. Preferably the diluent flow rate is substantially constant.

We further provide apparatus for carrying out the process of our invention, which comprises a device adapted to be associated with a tractor carrying a diluent reservoir, a spray head and a conduit connecting them, said device comprising an agricultural chemical liquid reservoir, a metering pump capable of being driven at a rate proportional to the speed of the tractor and means to convey the agricultural chemical from said agricultural chemical reservoir via the metering pump into said conduit.

We further provide an agricultural spraying device adapted to be transported by a tractor having a power take-off operable at a rate proportional to its forward speed, comprising a diluent reservoir, an agricultural chemical reservoir, a spray head, a pump to convey diluent from the diluent reservoir to the spray head and a metering pump to convey agricultural chemical from the agricultural chemical reservoir to the spray head, the said metering pump being adapted to be driven by the power take-off of the tractor.

In operating the devices of our invention, the metering pump may be driven by the tractor power take-off. Alternatively the devices may comprise a land wheel, rotation of which by the ground provides the motive power to operate the metering pump. Such a wheel preferably has radial splines, which give a good grip on uneven soil. In order to vary the rate of operation of the metering pump between two sprayings, it is possible to use land wheels of different sizes; alternatively a train of gears may be provided between the land wheel and the metering pump.

Preferably the capacity of the metering pump is adjustable. This adjustability may be obtained by providing a stroke-adjusting gear between the metering pump and the power take-off, whereby the length of the stroke of the metering pump can be varied. It is also possible to provide the metering pump with pistons of different diameter. In the former way continuous variation of the metering pump output can be obtained over a medium range, while in the latter way output is varied discontinuously over a large range. It is preferable therefore that the metering pump should be adjustable in both these ways.

A specific embodiment of the invention will now be described with reference to the accompanying drawings, in which.

Figure 1:
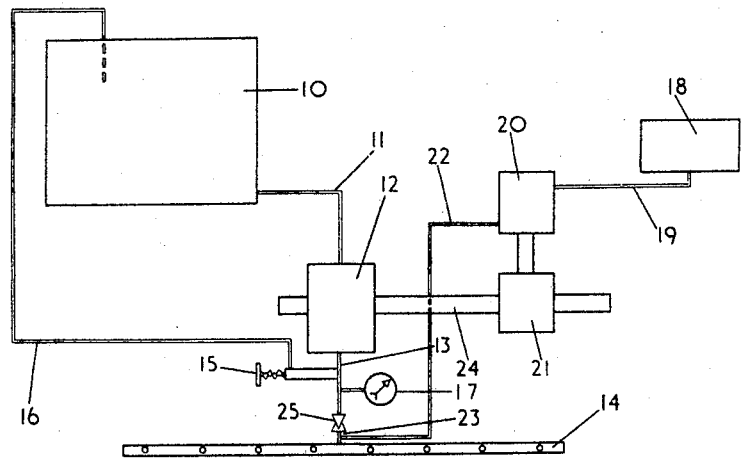
FIGURE 1 is a diagrammatical representation of the complete spraying device.
Figure 3:
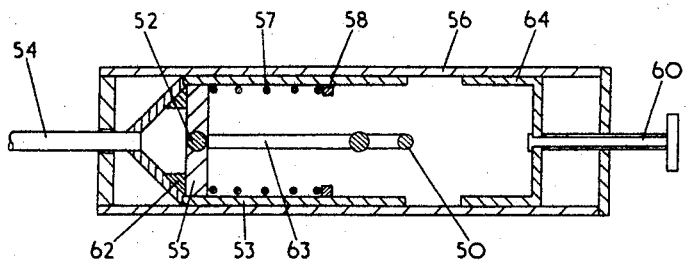
FIGURES 3, 4 and 5 illustrate the operation of the variable gear 21 shown in FIGURE 1, at three different stages in its cycle of operations.
Figure 4:
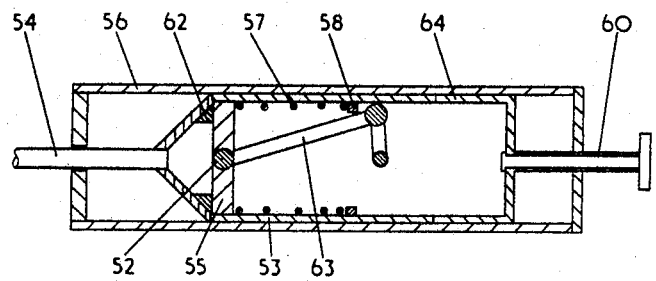
Figure 5:
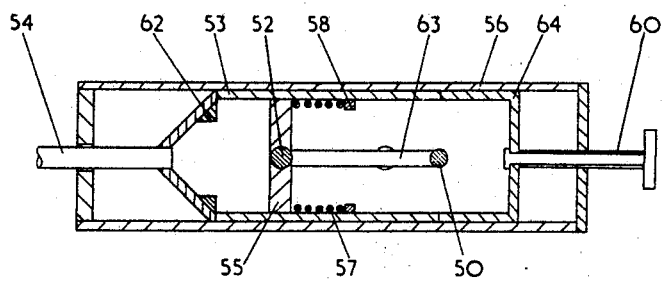

The apparatus shown in FIGURE 1 comprises a large water tank 10 connected by a pipe 11 to a large volume rotary water pump 12 of known type. The outlet of the rotary water pump 12 leads via a conduit 13 to a spray boom 14. From the conduit 13 there is also a tube 16 leading back to the water tank 10 in which is incorporated an excess pressure release valve 15. This valve 15 is so adjusted that when the water pressure in the conduit 13 rises above a pre-determined value the valve opens and water is returned along the tube 16 to the water tank 10. There is also a pressure indicator gauge 17 communicating with the conduit 13. The agricultural chemical reservoir 18 leads via a tube 19 to the metering pump 20 which is a single action piston pump, shown in more detail in FIGURE 2. The piston of the pump 20 connects with an adjustable gear 21 the construction and operation of which are shown in FIGURES 3, 4 and 5.

From the metering pump 20 a tube 22 conveys the agricultural chemical to the conduit 13. The junction of the conduit 13 and the tube 22 is close to the junction of the conduit 13 and the boom 14. A non-return valve 25 prevents the chemical from contaminating the water lines. The rotary pump 12 and the adjustable gear 21 are both driven by a common shaft 24 which is connected to the tractor power take-off (not shown). In the described embodiment the tractor power take-off speed is proportional to the forward ground speed of the tractor.

In operation, the water tank 10 and the chemical reservoir 18 are filled with water and chemical respectively. The adjustable gear 21 is adjusted to give the volume of agricultural chemical required. As the tractor moves forward, water is pumped by the rotary pump 12 out through the conduit 13 and agricultural chemical is metered by the pump 20 along the tube 22 to the junction 23, where it is diluted by the water and passes out through the spray boom on the crops. Ordinary variations in the speed of the tractor have substantially no effect on the rate at which water is pumped out through the non-return valve 25, but the speed of operation of the metering pump 20 is directly proportional to the speed of the tractor and therefore a slower tractor speed is automatically compensated for by a reduced volume of chamical being injected into the water.

Figure 2:
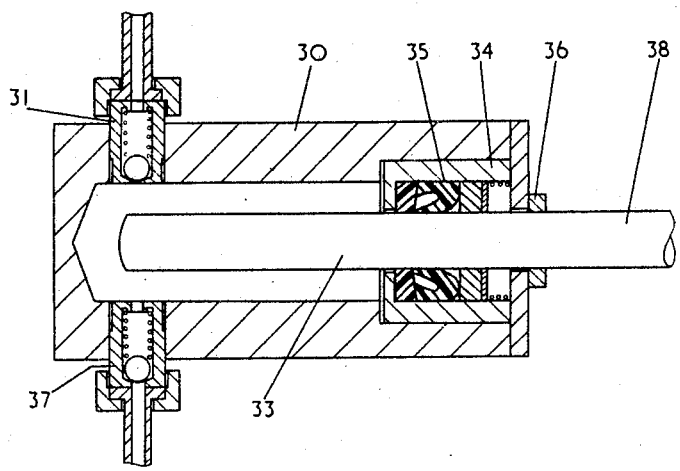
FIGURE 2 is a cross section through the metering pump 20 diagrammatically shown in FIGURE 1.

The metering pump 20 shown in FIGURE 2 comprises a casing 30 having an inlet ball valve 37 and an outlet ball valve 31 of known type. A narrow diameter piston 33 is connected at its end 38 by means not shown to the adjustable gear 21 (FIGURE 1). The piston 33 is held in place by a locking nut 36 and supported by a packing set 35 comprising a lip seal, an O ring and a packing ring. These are supported inside an adaptor bush 34. When desired, the narrow diameter piston 38 may be replaced by a larger diameter piston sweeping a greater volume and thereby increasing the output of the metering pump. The replacement may be carried out by removing the nut 36 withdrawing the piston 38, the packing set 35 and the adaptor bush 34 and inserting a piston of larger diameter with a new nut and an appropriate packing set. Because of the larger diameter of the piston no adaptor bush is required.

FIGURES 3, 4 and 5 show the operation of the adjustable gear 21. The piston 38 of the pump 20 is coupled to the shaft 54 of the adjustable gear 21 by means not shown. The shaft 54 is rigidly connected to a sleeve 53 reciprocable within a tubular housing 56. Within the sleeve 53 a cross head 55 is supported. In FIGURE 3 it is shown resting against end-stops 62. A strong compression spring 57 holds it in this position. The other end of the spring 57 is supported against stops 58 fixed to the sleeve 53. A connecting rod 63 connects a bearing 52 at the centre of the cross head 55 with an eccentric shaft 50. The latter is connected, by means not shown, to the shaft 24 (FIGURE 1) which is driven by the tractor power take-off. Also mounted within the housing 56 is a cup-shaped stop 64 which can be slid up and down to occupy varying positions within the housing 56 by adjusting the setting of the adjustor screw 60.

The operation of the gear is as follows. In FIGURE 3 the gear is shown with the shaft 54 in its extreme left-hand position. The eccentric shaft 50 rotates clockwise under the action of the tractor power take-off drawing the cross head 55 to the right. The cross head in turn imparts its motion through the spring 57 to sleeve 53. Thus the shaft 54 moves to the right. This motion continues until the revolution of the eccentric shaft 50 reaches the position shown in FIGURE 4. At this point, the sleeve 53 comes in contact with the cup-shaped stop 64 and its motion is halted. The cross head 55 continues its motion to the right following the eccentric shaft 50 but from here until the position shown in FIGURE 5 is reached, the motion of the cross head 55 is taken up by compression of the spring 57. As the eccentric shaft 50 moves on round from the position shown in FIGURE 5, the spring expands until the cross head comes into contact again with the stop 62. For the remainder of the cycle the cylindrical sleeve 53 and the shaft 54 are moved to the left until the position shown in FIGURE 3 is reached once more. It will be evident that by screwing in the adjustor screw 60 the motion of the sleeve 53 can be further restricted or even stopped altogether; while by screwing it out the motion of the sleeve 53 may be increased until it moves as far as the cross head 55.

The above described embodiment of our invention has numerous advantages over known spraying devices, besides the fact that it is no longer necessary to strictly control the ground speed of the tractor. These include accurate application of the agricultural chemical without handling problems; no contamination of the diluent reservoir with agricultural chemical; no surplus spray mixture requiring to be disposed of when spraying is finished; reduced frothing; reduction in corrosion problems and easier cleaning.

Numerous variations, improvements and refinements in the above described embodiment of the invention are possible, as will be apparent to those skilled in the art. For example, the metering pump stroke may be adjusted by means other than those illustrated in FIGURES 3–5. As previously mentioned, it may be preferred to drive the metering pump from a land wheel rather than the tractor power take-off. Valves may be inserted at appropriate points in the arrangement shown in FIGURE 1, so that the water circuit, or the agricultural chemical circuit, or parts of them, may be isolated. Various types of sprayhead may be used; for example, perforated booms, which may, if required, be oscillatable, for example as described in B.P. 949,487. We especially prefer to use one or more oscillating nozzles of the type described in British patent application No. 35,307/63; these minimise spray drift.

The above described embodiment may be used to spray liquid formulations of insecticides, fungicides and herbicides, e.g. contact herbicides, for example "Gramoxone" (registered trademark for paraquat sold by Imperial Chemical Industries Limited).

What we claim is:

1. A process for spraying a diluted agrictultural chemical from a tractor which comprises flowing liquid diluent from a liquid diluent reservoir to and through a spray head while metering agricultural chemical into the diluent flow, on the output side of a pump for the diluent, before it reaches the spray head at a rate which is linearly proportional to the speed of the tractor.

2. A process as claimed in claim 1 wherein the diluent flow rate is maintained substantially constant.

3. Apparatus for spraying a diluted agricultural chemical from a tractor comprising
    a diluent reservoir,
    an agricultural chemical reservoir
    a spray head
    a diluent pump for conveying diluent from the diluent reservoir, through conduits, and to said spray head
    a metering pump for conveying a flow of agricultural chemical from the agricultural chemical reservoir and into the diluent flow on the high pressure side of said diluent pump so that the agricultural chemical cannot contaminate the diluent supply in said reservoir, and
    means for operating said metering pump at a rate which is proportional to the ground speed of a tractor which carries said apparatus.

4. The apparatus of claim 3 wherein said last-named means comprises a power take-off of a tractor.

5. Apparatus as claimed in claim 3 wherein the capacity of the metering pump is continuously adjustable between limits.

6. Apparatus as claimed in claim 5 wherein the metering pump is adapted to be fitted with pistons of at least two different diameters.

7. Apparatus as claimed in claim 3 wherein the metering pump is driven by a land wheel.

8. Apparatus as claimed in claim 3 which comprises a rotary pump to convey diluent from the diluent reservoir to the spray head.

9. Apparatus as claimed in claim 8 wherein the output of the rotary pump is controlled by an excess pressure relief valve.

References Cited

FOREIGN PATENTS 916,025   1/1963   Great Britain.

EVERETT W. KIRBY, Primary Examiner

U.S. Cl. X.R.

239—155, 172, 11